US010523533B2

(12) United States Patent
Karacali-Akyamac et al.

(10) Patent No.: US 10,523,533 B2
(45) Date of Patent: Dec. 31, 2019

(54) CLOUD NETWORK ASSESSMENT BASED ON SCORING VIRTUAL NETWORK PERFORMANCE RELATIVE TO UNDERLYING NETWORK PERFORMANCE

(71) Applicant: International Business Machines Corporation, Armonk, NY (US)

(72) Inventors: Bengi Karacali-Akyamac, Bridgewater, NJ (US); John M. Tracey, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 15/188,735

(22) Filed: Jun. 21, 2016

(65) Prior Publication Data
US 2017/0366417 A1 Dec. 21, 2017

(51) Int. Cl.
*H04L 12/24* (2006.01)
*H04L 12/26* (2006.01)

(52) U.S. Cl.
CPC ...... *H04L 41/5067* (2013.01); *H04L 41/5009* (2013.01); *H04L 41/5096* (2013.01)

(58) Field of Classification Search
CPC ............. H04L 41/5009; H04L 41/5067; H04L 41/5096
See application file for complete search history.

(56) References Cited

U.S. PATENT DOCUMENTS

| 7,643,426 B1* | 1/2010 | Lee ........................ H04L 45/02 370/238 |
| 8,918,785 B1 | 12/2014 | Brandwine |
| 2001/0021176 A1* | 9/2001 | Mimura ................ H04L 1/0026 370/235 |
| 2002/0039352 A1* | 4/2002 | El-Fekih ................. H04L 12/14 370/252 |
| 2013/0286875 A1* | 10/2013 | Morrill ............... H04L 41/5009 370/252 |
| 2013/0290957 A1 | 10/2013 | Li |

(Continued)

OTHER PUBLICATIONS

M. El-Darieby et al., Performance modeling for virtual network based service provisioning. AN-7073746; in the Proceedings of IM'2001 IFIP/IEEE International Symposium on Integrated Network Management, May 14-18, 2001. pp. 1-14.

(Continued)

*Primary Examiner* — Abdullahi E Salad
(74) *Attorney, Agent, or Firm* — Kevin Jordan; Otterstedt, Wallace & Kammer, LLP (57) ABSTRACT

One aspect includes a method to assess virtual network performance, comprising: selecting at least a given pair of endpoints; determining at least one virtual path between the given pair of endpoints; determining at least one underlying network path between the given pair of endpoints; generating one or more flows between the given pair of endpoints over both the virtual path and the underlying network path; collecting one or more measurements for the virtual path and for the underlying network path; and determining at least one score for the given pair of endpoints at least in part by computing at least one ratio between at least one of the one or measurements for the virtual path and at least one of the one or more measurements for the underlying network path.

22 Claims, 7 Drawing Sheets

| Scenario 610 | Description 615 |
|---|---|
| 601 | Flows between end points on the same hypervisor and in the same virtual network |
| 602 | Flows between end points on the same hypervisor and in different virtual networks |
| 603 | Flows between end points on distinct hypervisors and in the same virtual network |
| 604 | Flows between end points on distinct hypervisors and in different virtual networks |
| 605 | Flows initiated from an end point in a virtual network to an external end point |
| 606 | Flows initiated from an external end point to an end point in a virtual network |

| Scenario 610 | Underlying Network Path 620 | Virtual Paths 630 |
|---|---|---|
| 601 | 401 → 401 | 411→ 412, 412→ 411, 421→ 422, 422→ 421 |
| | 402 → 402 | 413→ 414, 414→ 413, 423→ 424, 424→ 423 |
| 602 | 401 → 401 | 411 → 421, 421 → 411, 412 → 422, 422→ 412 |
| | 402 → 402 | 413 → 423, 423 → 413, 414 → 424, 424 → 414 |
| 603 | 401 → 402 | 411 → 413, 412 → 414, 421 → 423, 422 → 424 |
| | 402 → 401 | 413 → 412, 414 → 411, , 423 → 422, 424 → 421 |
| 604 | 401 → 402 | 411 → 423, 412 → 424, 421 → 413, 422 → 414 |
| | 402 → 401 | 423 → 412, 424 → 411, 413 → 422, 414 → 421 |
| 605 | 401 → 431 | 411 → 431, 412 → 431, 421 → 431, 422 → 431 |
| | 402 → 431 | 413 → 431, 414 → 431, 423 → 431, 424 → 431 |
| 606 | 431 → 401 | 431 → 411, 431 → 412, 431 → 421, 431 → 422 |
| | 431 → 401 | 431 → 413, 431 → 414, 431 → 423, 431 → 424 |

(56) References Cited

U.S. PATENT DOCUMENTS

| | | | | |
|---|---|---|---|---|
| 2014/0136682 A1* | 5/2014 | Lukas | ............... | G06F 17/30306 709/224 |
| 2014/0283045 A1 | 5/2014 | Brandwine | | |
| 2014/0215058 A1* | 7/2014 | Vicat-Blanc | .......... | H04L 43/045 709/224 |
| 2015/0138993 A1* | 5/2015 | Forster | .................... | H04L 41/12 370/248 |
| 2015/0143527 A1* | 5/2015 | Brandwine | ......... | G06F 9/45558 726/25 |
| 2015/0188770 A1* | 7/2015 | Naiksatam | .......... | H04L 41/0893 370/254 |
| 2016/0080272 A1* | 3/2016 | McNaughton | ........ | H04L 41/147 370/230.1 |
| 2016/0352578 A1* | 12/2016 | Chen | ....................... | H04L 41/12 |
| 2017/0222905 A1* | 8/2017 | Leroux | ............... | H04L 43/0876 |

OTHER PUBLICATIONS

Anonymous, Virtual Network Discovery in Cloud Environment. IP.com No. 000243013. Sep. 9, 2015, pp. 1-3 plus cover sheet.
T. Narten et al. Problem Statement: Overlays for Network Virtualization. IP.com No. 000239109. Oct. 1, 2014, pp. 1-23 plus cover sheet.
Anonymous; A resource score based method to provision virtual machines in a cloud system, Jul. 25, 2012. pp. 1-2 plus cover sheet.

\* cited by examiner

| Scenario 610 | Description 615 |
|---|---|
| 601 | Flows between end points on the same hypervisor and in the same virtual network |
| 602 | Flows between end points on the same hypervisor and in different virtual networks |
| 603 | Flows between end points on distinct hypervisors and in the same virtual network |
| 604 | Flows between end points on distinct hypervisors and in different virtual networks |
| 605 | Flows initiated from an end point in a virtual network to an external end point |
| 606 | Flows initiated from an external end point to an end point in a virtual network |

FIG. 6B

| Scenario 610 | Underlying Network Path 620 | Virtual Paths 630 |
|---|---|---|
| 601 | 401 → 401 | 411→ 412, 412→ 411, 421→ 422, 422→ 421 |
|  | 402 → 402 | 413→ 414, 414→ 413, 423→ 424, 424→ 423 |
| 602 | 401 → 401 | 411 → 421, 421 → 411, 412 → 422, 422→ 412 |
|  | 402 → 402 | 413 → 423, 423 → 413, 414 → 424, 424 → 414 |
| 603 | 401 → 402 | 411 → 413, 412 → 414, 421 → 423, 422 → 424 |
|  | 402 → 401 | 413 → 412, 414 → 411, , 423 → 422, 424 → 421 |
| 604 | 401 → 402 | 411 → 423, 412 → 424, 421 → 413, 422 → 414 |
|  | 402 → 401 | 423 → 412, 424 → 411, 413 → 422, 414 → 421 |
| 605 | 401 → 431 | 411 → 431, 412 → 431, 421 → 431, 422 → 431 |
|  | 402 → 431 | 413 → 431, 414 → 431, 423 → 431, 424 → 431 |
| 606 | 431 → 401 | 431 → 411, 431 → 412, 431 → 421, 431 → 422 |
|  | 431 → 401 | 431 → 413, 431 → 414, 431 → 423, 431 → 424 |

CLOUD NETWORK ASSESSMENT BASED ON SCORING VIRTUAL NETWORK PERFORMANCE RELATIVE TO UNDERLYING NETWORK PERFORMANCE

BACKGROUND

The present invention relates to the electrical, electronic and computer arts, and, more particularly, to virtual network performance assessment.

Software defined networking (SDN) offers agility, speed and cost savings in cloud deployment. The quality of service (QoS) provided by these virtual software defined networks, such as those deployed within a cloud infrastructure, impact the Quality of Experience (QoE) of the applications. To achieve a high level of QoE for applications deployed over virtual networks, it is necessary to first assess the networking capabilities of the virtual network and then identify and address areas and/or components requiring improvements.

Furthermore, to measure the performance impact of changes made to the virtual network software, it is necessary to quantitatively assess and track the networking performance across different software versions. However, performance assessment of virtual networking is a challenging for several reasons.

By way of example, a virtual network is typically composed of many components both hardware and software. Each of these components can be assessed individually based on custom metrics. However, to evaluate virtual networking from the QoE perspective of applications deployed over it, it is often necessary to quantitatively determine how all of the individual components interact.

As another example, the underlying infrastructure may be heterogeneous. Heterogeneity complicates performance evaluation because it makes the absolute performance of the virtual network essentially meaningless as a metric. For example, achieving 100 Mbps throughput is great in the case where the underlying Ethernet runs at 100 Mbps but lousy when the underlying network runs at 10 Gbps.

Also, many different types of network measurements can be collected in a cloud. Unfortunately, not all of them may provide insights to the networking performance experienced by application traffic.

Given the different sizes of clouds, diverse capabilities of individual cloud components, and heterogeneity in the infrastructure, combining measurements and metrics into meaningful scores for virtual network assessment remains a difficult problem. Thus, there is a long-felt unmet need for a solution to quantitatively assess the networking capabilities of an arbitrary heterogeneous software defined virtual network.

SUMMARY

One aspect includes a method to assess virtual network performance, comprising: selecting at least a given pair of endpoints; determining at least one virtual path between the given pair of endpoints; determining at least one underlying network path between the given pair of endpoints; generating one or more flows between the given pair of endpoints over both the virtual path and the underlying network path; collecting one or more measurements for the virtual path and for the underlying network path; and determining at least one score for the given pair of endpoints at least in part by computing at least one ratio between at least one of the one or measurements for the virtual path and at least one of the one or more measurements for the underlying network path.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
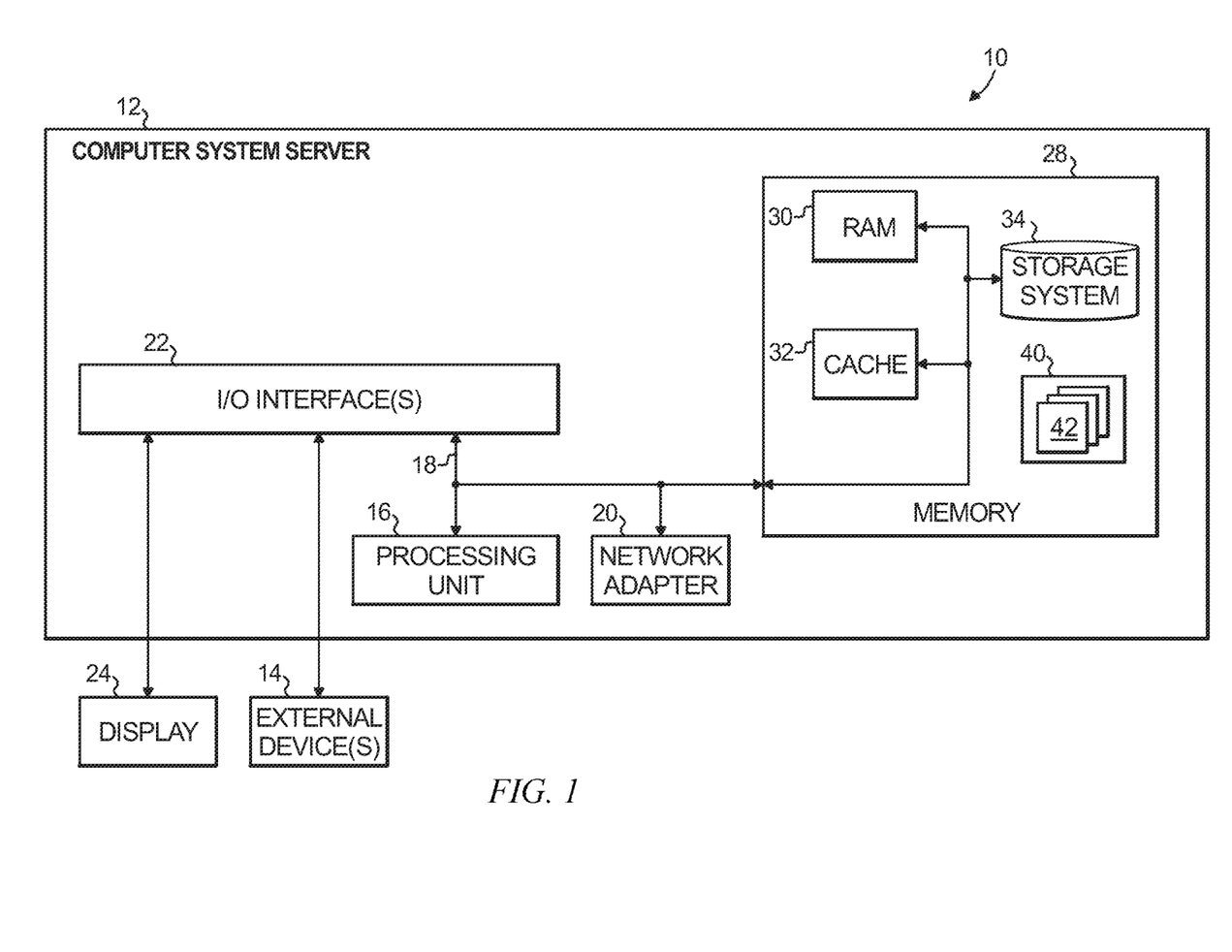
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
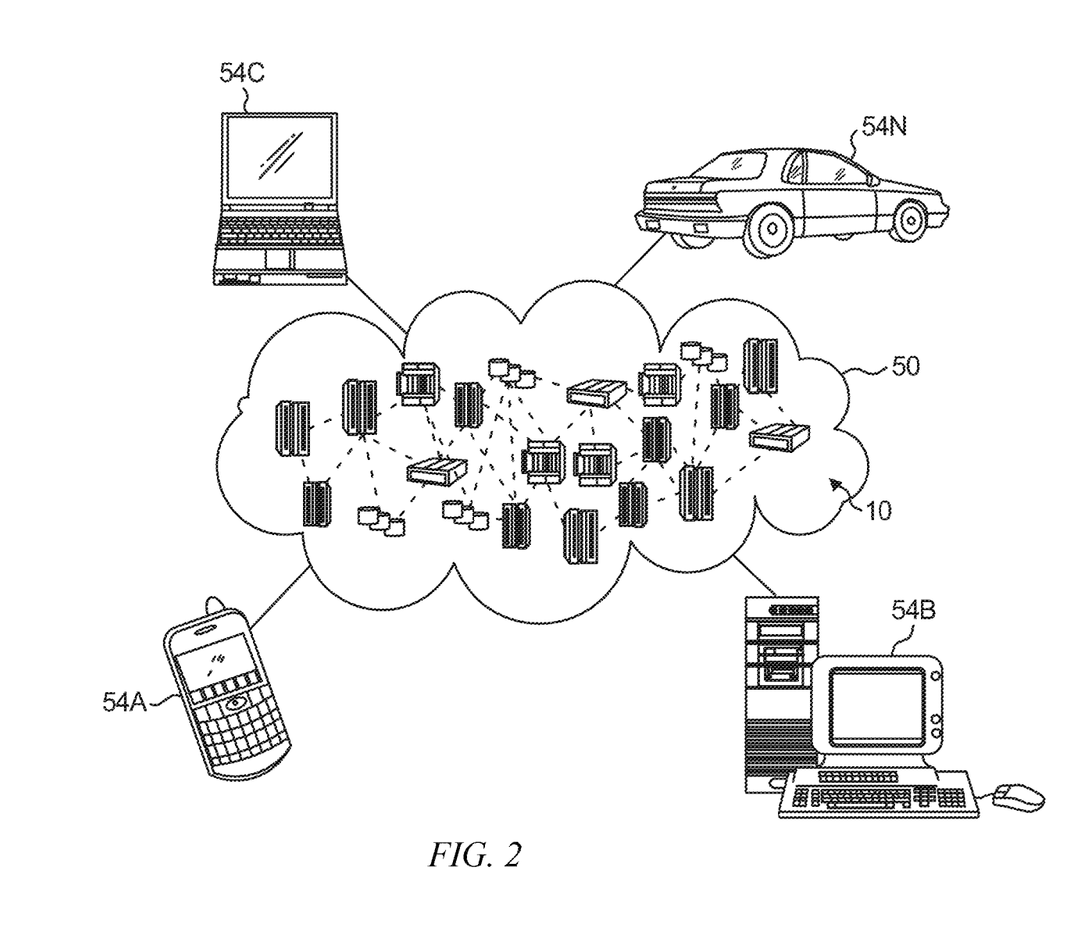
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
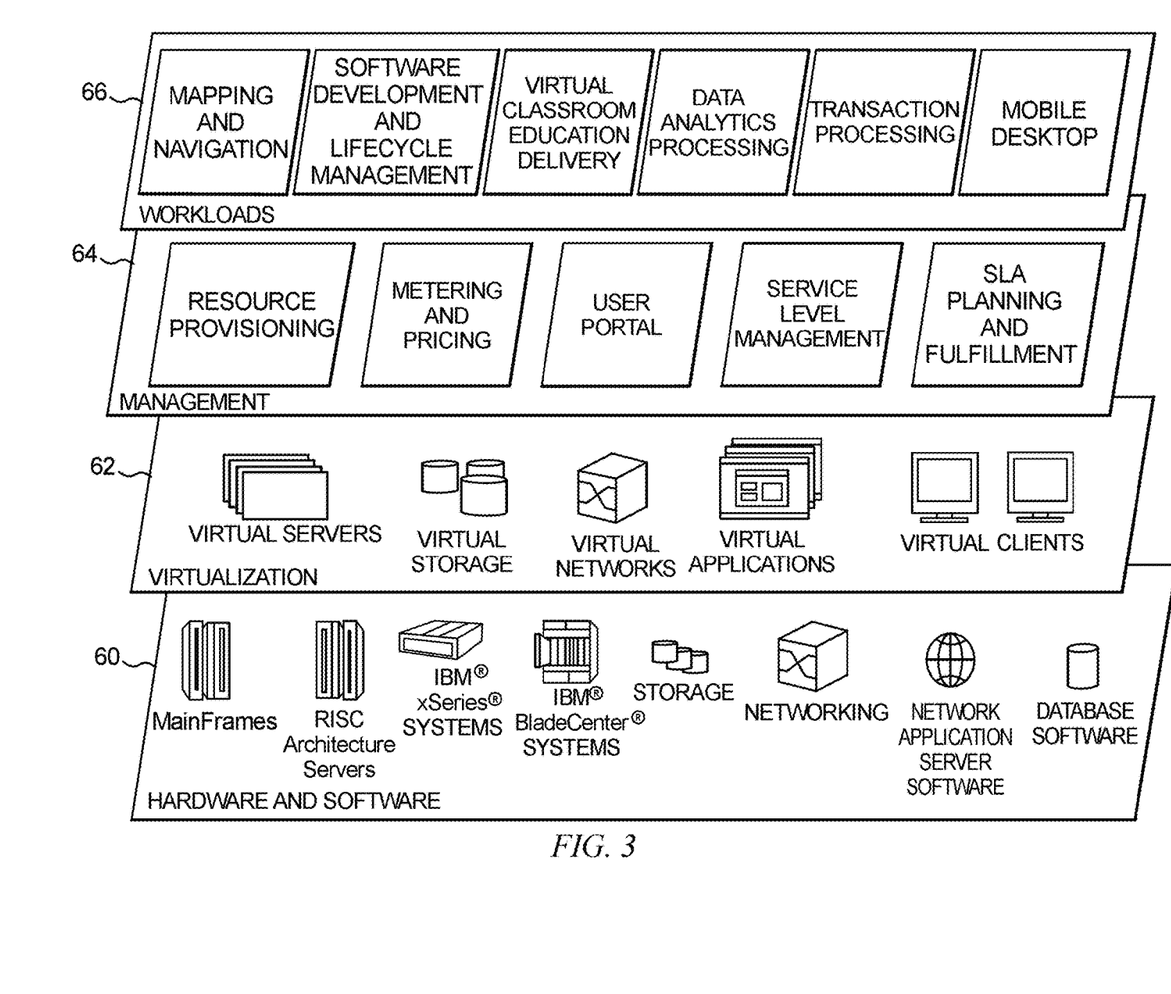
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

An illustrative embodiment of the present invention advantageously satisfies the aforementioned long-felt and previously-unmet need for a method to evaluate the performance of a virtual network, e.g., summarizing it with a scalar or vector numerical score. An illustrative embodiment leverages a ratio of performance of the virtual network to a corresponding scenario in the underlying network. This approach may be applied to one or more combinations of endpoints within the virtual network, each with one or more traffic workloads, to produce a set of ratios. The resulting set of ratios can be summarized to provide a network assessment score. Thus, an illustrative embodiment of the present invention may advantageously provide an easily understood score that can be determined for a wide variety of virtual network and network traffic characteristics. Illustrative embodiments may summarize evaluation performance as a single score but others may provide multiple values, for example as a vector rather than a scalar value.

A virtual path is an end-to-end path that carries application traffic (e.g., between virtual machines). Each such virtual path corresponds to an underlying network path, i.e., a path within the underlying infrastructure. Thus, an illustrative embodiment of the present invention involves mapping virtual paths to underlying network paths, measuring the performance on each virtual path and the matching underlying network path, and normalizing the virtual performance to the baseline performance of the underlying network. Thus, an illustrative embodiment of the present invention of the present invention advantageously evaluates networking performance from the perspective of applications by considering end-to-end virtual performance with respect to end-to-end performance in the underlying network.

An illustrative embodiment of the present invention may provide a method to assess virtual network performance with respect to underlying network performance on an end-to-end path basis. For example, in one illustrative embodiment of the present invention, if the throughput on a given virtual path is 80% of the throughput of the corresponding underlying network path, the given virtual path may be assigned a score of 0.8. Multiple end-to-end performance metrics can be collected (e.g., in addition to and/or instead of throughput) and combined into a single metric. An illustrative embodiment of the present invention of the present invention can factor in multiple virtual paths and their normalized scores using a potentially weighted scoring algorithm to compute a single figure for a given cloud.

In contrast to conventional techniques, an illustrative embodiment of the present invention provides more accurate assessment of the quality of service for application traffic which typically takes multiple paths within the cloud. Furthermore, by considering multiple virtual paths, an illustrative embodiment of the present invention exercises the interactive behavior of virtual network components. Furthermore, in a heterogeneous environment, the normalization of the virtual performance to the matching underlying performance permits analyzing performance across diverse paths on the same scale.

By focusing on low-level (e.g., packet level) networking metrics, an illustrative embodiment of the present invention allows measuring the networking performance that is indicative of the QoE different application traffic can experience. An illustrative embodiment of the present invention may utilize a weighted scoring algorithm to customize scores for individual applications based on those applications' deployment patterns, traffic characteristics and performance metrics. Often, the communication pattern between the application's components determines which virtual paths, and thus indirectly which underlying network paths, get exercised. An illustrative embodiment of the present invention can be customized to evaluate only these paths that the application will actually utilize.

Furthermore, an illustrative embodiment may facilitate injecting measurement traffic that can represent different traffic types (e.g. different transport protocols, packet sizes, packet cadence, session durations) that focus on different metrics (e.g. packet loss and jitter for Voice over Internet Protocol (VoIP), video and throughput for Transmission Control Protocol (TCP) based applications). The particular combinations of these characteristics can be tailored to one or more specific workloads so as to generate a performance score that is specifically indicative of how particular workload(s) will perform on the virtual network.

Conventional approaches for cloud network data plane performance often focus on measurement of throughput and latency for individual components such as virtual switches. Rather than evaluating individual components for a particular metric, illustrative embodiments of the claimed invention instead focus on system performance from the applications' perspective by designing a combination of traffic patterns and metrics representative of network performance when the entire virtual network is subjected to varying load conditions, advantageously providing evaluation of the network under different scenarios that dictate applications' QoE.

Other approaches evaluate cloud network performance for specific workloads, such as high performance computing, databases, and Hadoop. Rather than applying tests designed to evaluate communication patterns imposed by a particular application, an illustrative embodiment runs a set of micro-benchmarks intended to collectively reflect performance characteristics relevant to all applications. Micro-benchmarks advantageously compliment application-specific benchmarks by providing insight into which specific network performance characteristics most impact a given application. Micro-benchmarks also provide a more general-purpose evaluation which is particularly useful in the absence of a defined application benchmark. That said, illustrative embodiments of the present invention can be customized to particular workloads, while also evaluating the networking capabilities of heterogeneous virtual networks.

An illustrative embodiment of the present invention scores the capabilities of a virtual network with respect to an underlying network in a current cloud configuration, and may be particularly (though not exclusively) applicable to pre-deployment of the cloud where actual (operational) traffic is typically not present. Moreover, an illustrative embodiment of the present invention provides assessment of virtual network performance with respect to the underlying network performance agnostic of how the network virtualization is provided. Thus, illustrative embodiments of inventive principles may be applied to any network virtualization technology, including but not limited to overlay-based and/or OpenFlow based technologies. An illustrative embodiment of the present invention may be a candidate for integration into a cloud benchmarking suite, such as Cloud- Bench and/or Rally, in which numerous evaluation tools provide testing and analysis of a wide array of cloud performance characteristics.

Figure 4A:
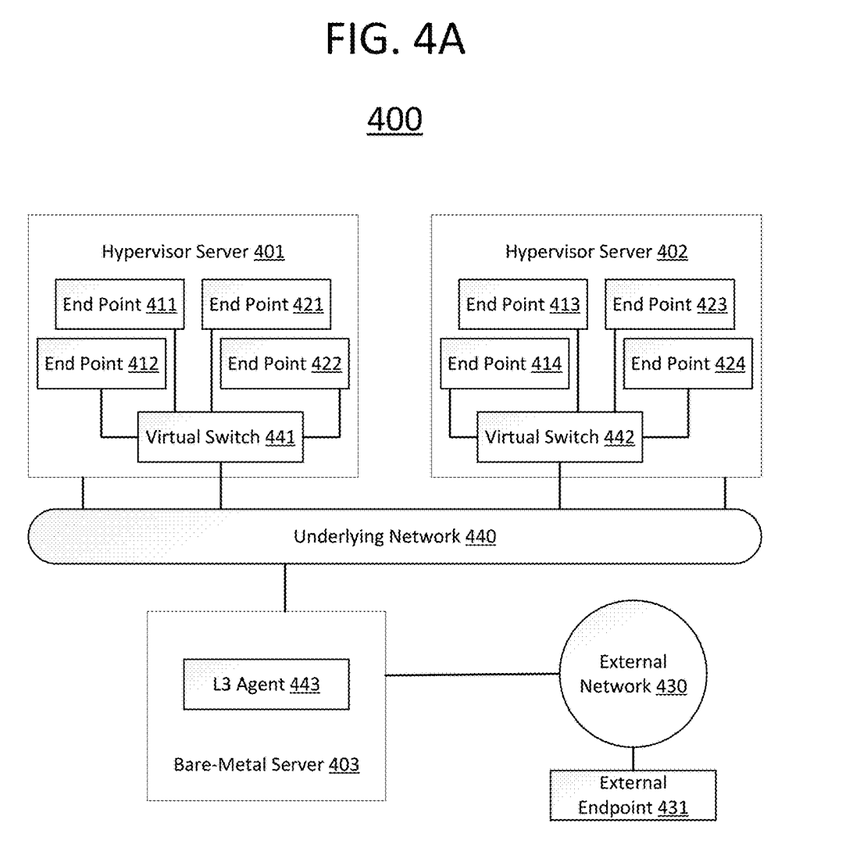
FIG. 4A depicts an exemplary underlying network infrastructure according to an illustrative embodiment of the present invention.
Figure 4B:
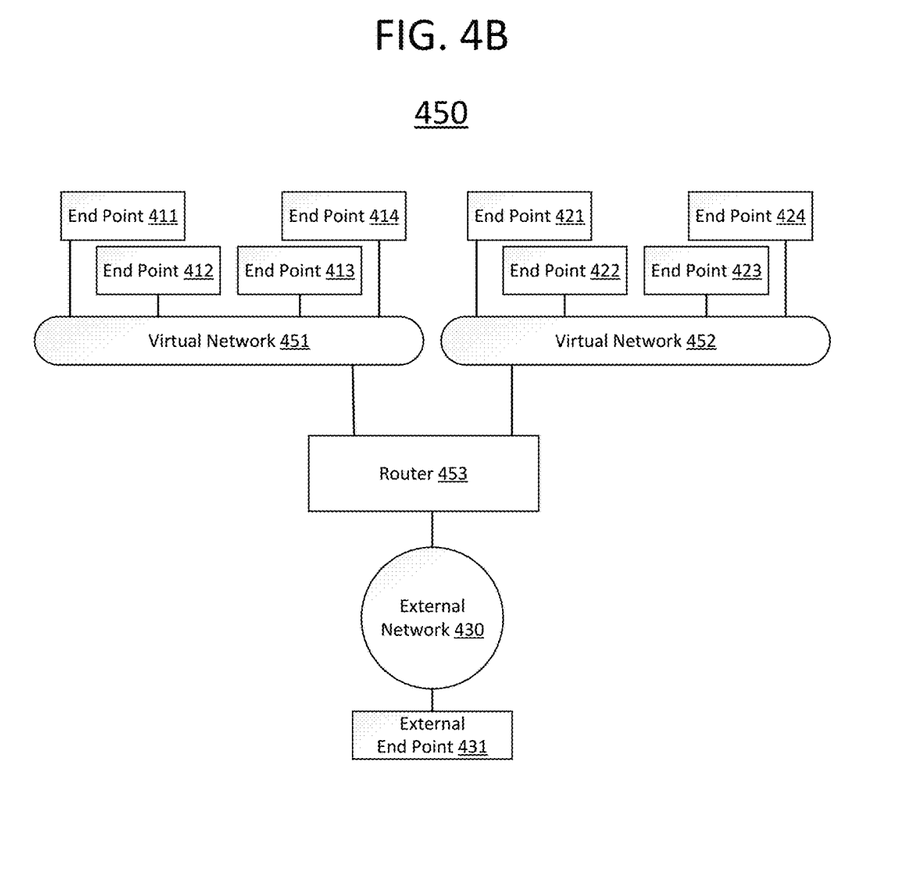
FIG. 4B depicts an exemplary virtual view of the infrastructure shown in FIG. 4A according to an illustrative embodiment of the present invention.

FIGS. 4A and 4B are different views of the same network, and will be used to illustrate features associated with an exemplary embodiment of the present invention. FIG. 4A illustrates the underlying physical architecture 400, while FIG. 4B shows an equivalent virtual network configuration 450. Although illustrative embodiments of the present invention are primarily described herein with reference to application of exemplary method 500 shown in FIG. 5 to a network such as shown in FIGS. 4A and 4B, one skilled in the art would understand that inventive principles may be more broadly applied in numerous other contexts by applying (and/or adapting) the specific techniques discussed herein.

As used herein, an endpoint refers to any entity that can be a source and/or sink for measurement traffic. Endpoints for one or more embodiments of the present invention may include, e.g., virtual machines, containers, and processes running on underlying servers or other physical hardware elements. In an illustrative embodiment of the present invention, the virtual network configuration may be distinct from the layout of the underlying physical infrastructure. For example, in FIG. 4A, endpoints 411, 412, 421 and 422 are located physically on a first server 401, while endpoints 413, 414, 423 and 424 are located physically on a second server 402. In an illustrative embodiment, each of the endpoints shown in FIGS. 4A and 4B represents a respective virtual machine. Thus, servers 401 and 402 in FIG. 4A are host machines, which preferably include a hypervisor to manage multi-tenant execution of virtual machines (endpoints).

By contrast, as shown in FIG. 4B, endpoints 411, 412, 413 and 414 are on a first virtual network 451, while endpoints 421, 422, 423 and 424 are on a second virtual network 452. A single server can have multiple addresses, and therefore can simultaneously be part of multiple virtual networks. For example, server 401 and/or server 402 could have a first address on virtual network 451 and a second address on virtual network 452, thus allowing for multiple virtual networks 451 and 452 to be configured within the underlying infrastructure 440 between a given pair of underlying servers 401 and 402. Indeed, endpoints (e.g., 411 and 421) which are physically hosted on the same server (e.g., 401) could still be located on different virtual networks (e.g., 451 and 452, respectively.)

An illustrative embodiment could implement using this virtual network functionality using, for example, OpenStack® Networking, also known as Neutron. OpenStack® is a registered trademark of the OpenStack Foundation, which maintains this open-source software. With reference to FIG. 4A, host servers 401 and 402 would each include a respective virtual switch 441 and 442 (e.g., Open vSwitch). In an illustrative embodiment, each of these virtual switches implements a layer 2 (L2) agent which acts as a client to a single layer 3 (L3) agent 443 implemented on server 403. Unlike servers 401 and 402, which include hypervisors to facilitate execution of multiple virtual machines thereon, server 403 is preferably a bare-metal server in which the L3 agent 443 is installed without a hypervisor for single-tenant operation. For example, server 403 could be a dedicated OpenStack® Controller where L3 agent 443 is included with a Neutron server. The aforementioned L2 agents within virtual switches 441 and 442 allow endpoints coupled to the same underlying network 440 (e.g., endpoints 411-414 and 421-424 on servers 401 and 402) to interact over multiple virtual networks 451 and 452. However, communication with an external endpoint 431 over an external network 430 requires L3 agent 443 to act as a gateway between underlying network 440 and external network 430.

FIG. 4B depicts the same network architecture shown in FIG. 4A, but provides a virtualized view in which much of the underlying physical infrastructure is abstracted away. Thus, the underlying network 440 and servers 401-403 (as well as networking components 441-443 within servers 401-403) shown in FIG. 4A are replaced by virtual networks 451 and 452 and router 453. As discussed above, virtual networks 451 and 452 could be implemented by using virtual switches 441 and 442 as an interface between underlying servers 401 and 402 (and the endpoints therein) with the underlying network 440. Router 453 allows virtual networks 451 and 452 to interface with external network 430 in FIG. 4B, and thus provides functionality analogous to L3 agent 443 within server 403 in FIG. 4A. Rather being depicted within servers 401 and 402 coupled to underlying network 440 as in FIG. 4A, endpoints 411-414 and 421-424 are instead shown as coupled to virtual networks 451 and 452, respectively.

Figure 5:
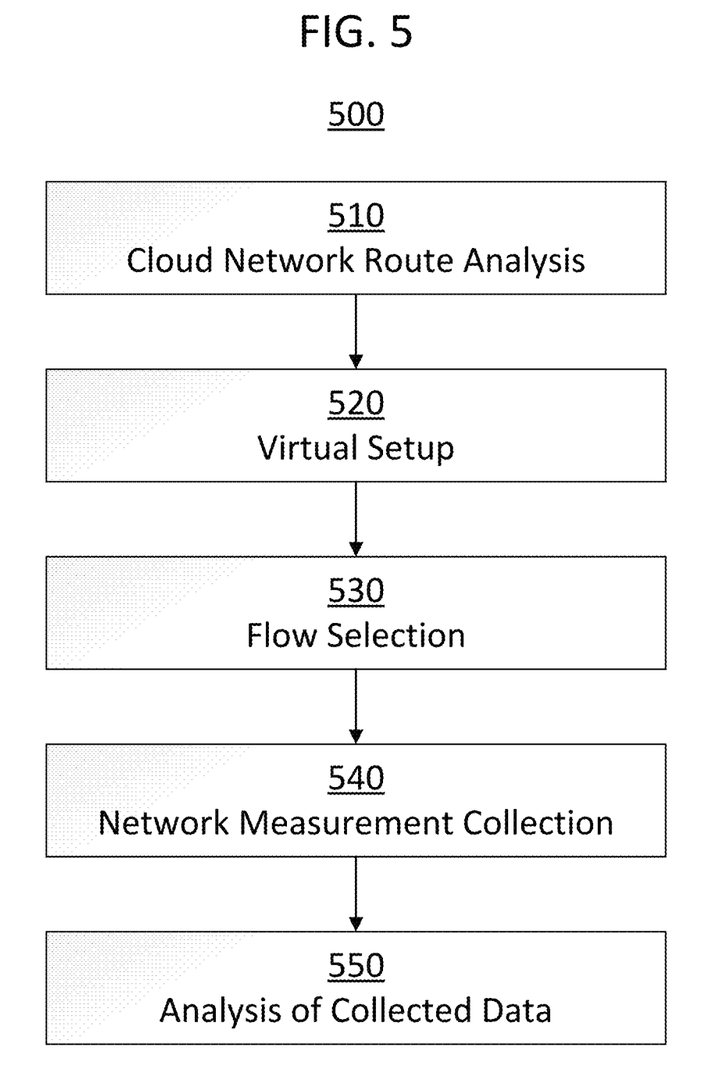
FIG. 5 is a flowchart depicting an exemplary technique according to an illustrative embodiment of the present invention.

FIG. 5 is a flowchart depicting an exemplary method 500 according to an illustrative embodiment of the present invention. Method 500 begins in step 510, cloud network route analysis. Step 510 may include analysis of the underlying network infrastructure to determine which underlying networks are used in the virtualization and identifies the network addresses of the endpoints in the underlying network. For example, if the underlying network is IP, then the network addresses of endpoints in the underlying network are their IP addresses.

As previously noted, there may be multiple networks in the underlying infrastructure such that an underlying server can have multiple addresses on each such network, resulting in multiple underlying network paths between a pair of servers. Thus, step 510 uses a routing matrix R that describes the network addresses that should be used to reach endpoints in the underlying network. Specifically, for an underlying network with m servers, R is an m×m matrix R, where $R_{i,j}$ denotes a path in the underlying network from the ith server to the jth server. The path includes the destination network address to reach the jth server.

For example, an exemplary routing matrix R for the illustrative architecture discussed above with reference to FIG. 4A would include paths in underlying network 440 between servers 401, 402 and 403. In this example, entry $R_{1,2}$ within routing matrix R may denote the path in underlying network 440 from server 401 to server 402, including the destination address to reach server 402 on underlying network 440.

Routing matrix R can be input by the user, determined by an automated discovery process, or a combination of both. An exemplary discovery process may utilize the network addresses utilized by the virtualization components as well as the routing tables in the servers (e.g., within virtual switches 441 and 442 in FIG. 4A).

Step 510 also includes determining a mapping of virtual paths to underlying network paths, e.g., using the aforementioned routing matrix R. The notation host(u) is used herein denote the underlying server that the virtual entity u resides on. For example, with reference to FIG. 4A, host(411) is server 401, the underlying server that endpoint 411 resides on, while host(413) is server 402, the underlying server that endpoint 413 resides on.

The route from a virtual entity u to another virtual entity v may be determined by the virtualization software. If u and v are in the same network, the virtual path typically involves going through a software switch on host(u) and on to host(v). In this case, the underlying network path corresponding to the virtual path from u to v is the path in R from host(u) to host(v). Thus, with reference to FIG. 4A, the underlying network path corresponding to the virtual path from endpoint 411 to endpoint 413 is the path in R from server 401 to server 402.

If u and v are in different virtual networks, depending on the implementation, there may be a software gateway on the path. This software gateway may be on a different server which results in additional routing hops. Thus, with reference to FIG. 4B, even though endpoints 411 and 412 are both on server 401, routing between endpoint 411 on virtual network 451 and endpoint 421 on virtual network 452 requires hops to and from router 453, which is on server 403. In this scenario, we attribute the overhead associated with the additional hops to virtualization and map the virtual path to the path in R from host(u) to host(v) to compare to the baseline.

If v is an endpoint in an external network, then the virtual path maps to the route in the underlying network from host(u) to v. If u is an endpoint in an external network, then the virtual path maps to the route in the underlying network from u to host(v). In the embodiment discussed above with reference to FIGS. 4A and 4B, a virtual path from endpoint 411 to external endpoint 431 will map to the route in underlying network 440 from server 401 (on which endpoint 411 resides) to server 403 (which is used to route traffic from underlying network 440 to external network 430, and thus external endpoint 431).

Step 520 involves virtual setup, including creating virtual configurations of virtual network elements and virtual endpoints. As previously discussed, an endpoint includes any entity that can be a source or a sink for measurement traffic. Examples of endpoints include virtual machines, containers and processes running on underlying servers.

Optionally, the maximum number of entities of each kind may be determined upfront based on heuristics applied to the infrastructure capabilities. For instance, an example capacity heuristic may indicate that the maximum number of virtual central processing units (VCPUs) on a server cannot exceed the total central processing unit (CPU) cores. Similar heuristics can be used for memory and disk. After determining the capacity for the number of VMs, a maximum number recommendation for networks can be determined. For the sake of simplicity, FIG. 4A illustrate the same number of VMs on each host server (e.g., servers 401 and 402 each host four endpoints), but the principles discussed herein can be generalized to cases where different number of VMs are hosted on each server.

Step 530 involves determining and/or selecting the flows that are injected into the network. A flow is identified by a pair of endpoints. Within a virtual network, flows may typically extend between a large number of virtual endpoint pairs. However, a communication pattern between the application's components may dictate which virtual paths and indirectly which underlying network paths get exercised. Thus, an illustrative embodiment of the present invention can be customized to evaluate only these paths that the application will utilize.

Different pairs may have different characteristics. For example, a given pair may reside on a single IP subnet while another pair may span subnets. Similarly, a given pair (e.g., endpoints 411 and 412 on virtual network 451 in FIG. 4B) may reside on the same underlying server (e.g., 401 in FIG. 4A) while another pair (e.g., endpoints 411 and 413) spans two servers. Each of these characteristics has the potential to impact performance. It is therefore desirable to evaluate performance of a set of flows that span the multiple characteristics that are of interest.

Moreover, different types of traffic may be injected between a given pair of endpoints. For example, an illustrative embodiment of the present invention may allow injecting measurement traffic that can represent different traffic types (e.g. different transport protocols, packet sizes, packet cadence, session durations) that focus on different metrics (i.e. packet loss and jitter for VoIP or IP video and throughput for TCP based applications). The particular combinations of these characteristics can be tailored to one or more specific workloads. For example, if the workload of interest is a video streaming application, UDP streams with a duration, packet size, and cadence matching typical traffic characteristics of the video application can be injected to the network during measurement collection.

Figure 6A:
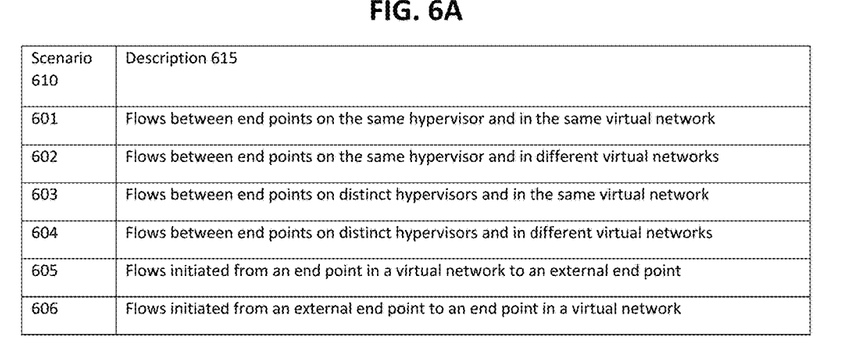
FIG. 6A is a table showing exemplary scenarios with corresponding descriptions according to an illustrative embodiment of the present invention.

In an illustrative embodiment, step 530 may utilize a flow generation component that implements an algorithm for the distribution of flows across endpoints in the virtual network based on a set of scenarios and constraints. FIG. 6A shows example scenarios 601-606 in column 610, with corresponding descriptions in column 615. Additional constraints may include requiring every endpoint to be a source or sink for an exact number of flows such as 1, 2, 4, etc. Flows may be injected between the virtual endpoint pairs as well as between endpoint pairs in the underlying network. Flows injected between virtual endpoint pairs provide performance for virtual paths, while flows injected between endpoint pairs in the underlying network provide performance for the underlying network paths.

Figure 6B:
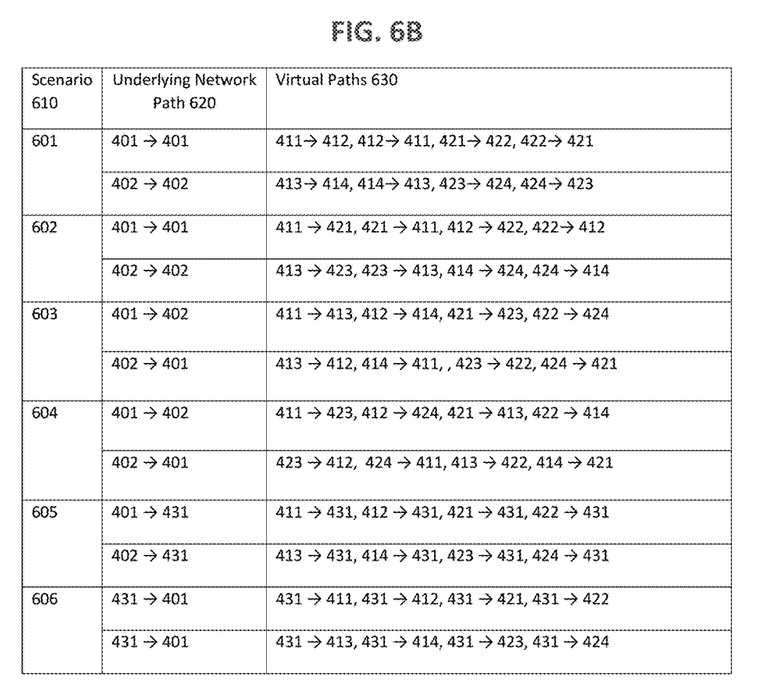
FIG. 6B shows exemplary flows generated by application of the scenarios in FIG. 6A to the illustrative architecture shown in FIGS. 4A and 4B according to an illustrative embodiment of the present invention.

FIG. 6B shows exemplary flows generated for the illustrative architecture discussed above with reference to FIGS. 4A and 4B. In particular, FIG. 6B shows flows for each of the scenarios 610 in FIG. 6A, with the constraint that each endpoint is a source or a sink in exactly 1 flow. Flows between endpoints in the underlying network are shown in column 620 of FIG. 6B, and flows between virtual endpoints are shown in 630 of FIG. 6B.

Thus, as shown in FIG. 6A, scenario 601 refers to flows between endpoints on the same hypervisor and in the same virtual network. As shown in FIG. 6B, scenario 601 includes the following virtual paths for the underlying network path 401→401 (i.e., all endpoints are on server 401): 411→412 and 412→411 (both on virtual network 451), and 421→422 and 422→421 (both on virtual network 452). As shown in FIG. 6B, scenario 601 includes the following virtual paths 630 for the underlying network path 402→402 (i.e., all endpoints are on server 402): 413→414 and 414→413 (both on virtual network 451), and 423→424 and 424→423 (both on virtual network 452).

As shown in FIG. 6A, scenario 602 refers to flows between endpoints on the same hypervisor and in the different virtual networks. As shown in FIG. 6B, scenario 601 includes the following virtual paths for the underlying network path 401→401 (i.e., all endpoints are on server 401): 411→421, 421→411, 412→422 and 422→412. As shown in FIG. 6B, scenario 602 also includes the following virtual paths for the underlying network path 402→402 (i.e., all endpoints are on server 402): 413→423, 423→413, 414→424 and 424→414.

As shown in FIG. 6A, scenario 603 refers to flows between endpoints on distinct hypervisors and in the same virtual network. As shown in FIG. 6B, scenario 603 includes the following virtual paths for the underlying network path 401→402: 411→413 and 412→414 (all on virtual network 451), and 421→423 and 422→424 (all on virtual network 452). As shown in FIG. 6B, scenario 603 also includes the following virtual paths for the underlying network path 402→401: 413→412 and 414→411 (all on virtual network 451), and 423→422 and 424→421 (all on virtual network 452).

As shown in FIG. 6A, scenario 604 refers to flows between endpoints on distinct hypervisors and in different virtual networks. As shown in FIG. 6B, scenario 604 includes the following virtual paths for the underlying network path 401→402: 411→423, 412→424, 421→413, and 422→414. As shown in FIG. 6B, scenario 603 also includes the following virtual paths for the underlying network path 402→401: 423→412, 424→411, 413→422, 414→421.

As shown in FIG. 6A, scenario 605 refers to flows initiated from an endpoint in a virtual network to an external endpoint. As discussed above, an external endpoint refers to an endpoint (e.g., 431 in FIGS. 4A and 4B) which is on an external network (e.g., 430 in FIGS. 4A and 4B) rather than the underlying network (e.g., 440 in FIG. 4A), and hence is outside any of the virtual networks (e.g., 451 and 452 in FIG. 4B) corresponding to the underlying network (e.g., 440 in FIG. 4A). As shown in FIG. 6B, scenario 605 includes the following virtual paths for the underlying network path 401→431: 411→431, 412→431, 421→431 and 422→431. As shown in FIG. 6B, scenario 605 also includes the following virtual paths for the underlying network path 402→431: 413→431, 414→431, 423→431 and 424→431.

As shown in FIG. 6A, scenario 606 refers to flows initiated from an external endpoint to an endpoint in a virtual network. As shown in FIG. 6B, scenario 606 includes the following virtual paths for the underlying network path 431→401: 431→411, 431→412, 431→421 and 431→422. As shown in FIG. 6B, scenario 606 also includes the following virtual paths for the underlying network path 431→402: 431→413, 431→414, 431→423 and 431→424.

Once a set of endpoints is selected in step 530, flows are generated between the selected endpoints and performance measurements are collected in step 540. Thus, step 540 involves injecting flows determined in step 530 and collecting network performance data pertaining to the injected flows.

There are many options in terms of specifically how flows are injected. For example, flows may be connection oriented, such as with transmission control protocol (TCP), or connectionless, such as with user datagram protocol (UDP). Flows may consist of a large amount of streaming data or as little as a single packet or even no data traffic. Flows may be short lived or persist for a significant time. Multiple flows can be injected between a given endpoint pair or a single flow can be used.

Similarly, one or more performance metrics can be collected for a given flow, including throughput, latency, jitter and packet/data loss. Measurement collection can be accomplished, for example, by utilizing agent software installed on endpoints that inject traffic and collect measurements. An additional measurement controller component may orchestrate the measurement collection and reporting of the results by directing the endpoints to inject flows with specified parameters.

For a cloud with m servers, there are m×m directional paths that can be measured. Multiple processes may be used on an underlying server to collect statistics. The statistics pertaining to each measurement can be collected in a database or kept in any other format (e.g. text files). Regardless of the storage method, it may be desirable to index each piece of data to include the flow identifiers and the measurement values. For example, flows can be identified by the source and/or destination endpoints and/or network addresses. Flows can additionally and/or alternatively be identified by time of data collection that indicates which concurrent group of measurements the flow is part of.

In step 550, performance metrics pertaining to the traffic injected by the flows are analyzed. To analyze the data in the same scale, performance exhibited by the virtual network is normalized to performance exhibited by the underlying network. Thus, in a heterogeneous environment, this normalization of the virtual performance to the matching underlying performance permits analyzing performance across diverse paths on the same scale. Below is an example of a suitable algorithm in pseudocode:

For each scenario k measured:
    For each path p in the underlying network exercised in scenario k:
        $V_{k,l}$<-All flows between endpoints in the virtual network going through p
        $U_{k,l}$<-All flows between endpoints in the underlying network going through p
        $S_{k,l}$<-Perf($V_{k,l}$)/Perf($U_{k,l}$)

The Perf function may represent many performance metrics. For instance for throughput, the throughput measured across all flows is summed for $V_{k,l}$ and $U_{k,l}$. The score $S_{k,l}$ represents the ratio of performance of paths in the virtual network to the corresponding path in the underlying network. For example, if the throughput on the virtual paths is 80% of the throughput of the corresponding underlying network path p, the score $S_{k,l}$ for p is 0.8. FIG. 6B shows an example of the mapping that is used in grouping the flows (column 630) based on their physical paths (column 620), in which k=6 (six scenarios, shown in column 610) and l=2 (two paths for each scenario, shown in column 620).

For other metrics such as delay, the score computation may be modified to reflect the additional delay incurred in the virtual paths with respect to the delay observed in the underlying network paths. To keep the interpretation of the score consistent across metrics, delay score could be mapped to a number in the range 0 to 1 where a score close to 1 would indicate comparable delay to the underlying network path delay and a score close to 0 would indicate significantly larger virtual path delays. Such a score transformation may utilize a logarithmic scale to transform the magnitude of the additional virtual delay to the 0 to 1 range.

Once the scores for each scenario are determined, they can optionally be combined into a single score, e.g., using median, arithmetic mean, geometric mean, etc. By way of example, in an illustrative embodiment, a weighted average of all scenario scores may be taken to determine the score for the cloud. In the case of equal weight between scenarios, the score is an average across all per scenario scores. However, depending on application deployment models, some scenarios may be given higher priority. For example, if network crossing between endpoints is rarely utilized when a particular application is deployed, Scenarios 2 and 4 may be weighted lower. As a result, illustrative embodiments of the present invention advantageously facilitate customization of assessment according to application deployment model, traffic characteristics and/or performance metrics.

Once the flows between endpoints in the underlying network are injected (e.g. flows in column 620 of FIG. 6B), the baseline performance is established. There is no need to repeat the baseline measurements when applying the technique to evaluating different virtualization solutions or new versions of an existing one. The technique can optionally be repeated to analyze a virtual network in more detail based on injecting more flows between endpoints in the underlying network and/or virtual endpoints. More measurements can improve the accuracy.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface to implement user interface aspects of an illustrative embodiment of the present invention is reporting a score determined in step 550 to a computing device of a user. Such a user interface can be implemented, for example, via hypertext markup language (HTML) code served out by a server or the like, to a browser of a computing device of a user. The HTML is parsed by the browser on the user's computing device to create a graphical user interface (GUI). Any number of techniques for generating web pages may be used.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to assess virtual network performance comprising:
   selecting at least a given pair of endpoints;
   determining at least one virtual path between the given pair of endpoints;
   determining at least one underlying network path between the given pair of endpoints;
   generating one or more flows between the given pair of endpoints over both the virtual path and the underlying network path;

collecting one or more network measurements for the virtual path and for the underlying network path;

determining at least one score for the given pair of endpoints at least in part by computing at least one ratio between at least one of the one or more network measurements for the virtual path and at least one of the one or more network measurements for the underlying network path; and combine the at least one score with a score for another pair of endpoints to generate a network assessment score, the score for the another pair being a corresponding ratio between at least one of the one or more network measurements for the virtual path and at least one of the one or more network measurements for the underlying network path.

2. The method of claim 1, further comprising determining at least one summary score as a function of a plurality of scores for respective pairs of endpoints.

3. The method of claim 2, wherein the function comprises a weighted average function.

4. The method of claim 1, wherein:
at least one of the given pair of endpoints comprises a first endpoint hosted on a first server within an underlying network;
the underlying network corresponds to one or more virtual networks, and
the at least one of the given pair of endpoints is within at least one of the one or more virtual networks.

5. The method of claim 4, wherein the first endpoint hosted on the first server comprises at least one of a virtual machine hosted on the first server and a container hosted on the first server.

6. The method of claim 4, wherein:
the given pair of endpoints comprises the first endpoint and a second endpoint;
the second endpoint is external to the underlying network; and
the second endpoint is external to each of the one or more virtual networks.

7. The method of claim 4, wherein:
the first server hosts a plurality of endpoints, comprising the first endpoint and a second endpoint; and
the given pair of endpoints comprises the first endpoint and the second endpoint.

8. The method of claim 7, wherein:
the underlying network corresponds to a plurality of virtual networks comprising a first virtual network and a second virtual network;
the first endpoint is within the first virtual network; and
the second endpoint is within the second virtual network.

9. The method of claim 4, wherein:
the underlying network comprises the first server and at least a second server; and
the given pair of endpoints comprises the first endpoint and a second endpoint hosted by the second server within the underlying network.

10. The method of claim 9, wherein:
the underlying network corresponds to a plurality of virtual networks comprising a first virtual network and a second virtual network;
the first endpoint is within the first virtual network; and
the second endpoint is within the second virtual network.

11. The method of claim 4, wherein:
at least another one of the given pair of endpoints is neither within the underlying network nor within the one or more virtual networks.

12. The method of claim 1, further comprising determining at least one mapping from the at least one virtual path to the at least one underlying path based at least in part on respective network addresses for at least the given pair of endpoints within the underlying network.

13. The method of claim 1, wherein at least the given pair of endpoints is selected based at least in part on a communication pattern between components of at least one specific application.

14. The method of claim 1, wherein at least the given pair of endpoints is selected based at least in part on whether the at least one virtual path is utilized by at least one specific application.

15. The method of claim 1, wherein at least one flow of the one or more flows is generated with at least one characteristic matching traffic associated with at least one specific application.

16. The method of claim 1, wherein generating one or more flows between the given pair of endpoints comprises generating at least a first flow and a second flow between the given pair of endpoints, the first flow having at least one traffic characteristic different than the second flow.

17. The method of claim 15, wherein the at least one traffic characteristic comprises one or more of transport protocol, packet size, packet cadence, and session duration.

18. The method of claim 1, wherein at least the given pair of endpoints are selected based at least in part on whether the given pair of endpoints are:
on a same server and in a same virtual network;
on a same server and in different virtual networks;
on different servers and in a same virtual networks; or
on different servers and different virtual networks.

19. The method of claim 1, wherein at least the given pair of endpoints are selected based at least in part whether at least the given pair of endpoints is each within a given underlying network.

20. The method of claim 1, wherein at least the given pair of endpoints are selected based at least in part whether at least the given pair of endpoints is each within any virtual network corresponding to a given underlying network.

21. An apparatus comprising:
a memory; and
at least one processor, coupled to said memory, and operative to:
select at least a given pair of endpoints;
determine at least one virtual path between the given pair of endpoints;
determine at least one underlying network path between the given pair of endpoints;
generate one or more flows between the given pair of endpoints over both the virtual path and the underlying network path;
collect one or more network measurements for the virtual path and for the underlying network path;
determine at least one score for the given pair of endpoints at least in part by computing at least one ratio between at least one of the one or more network measurements for the virtual path and at least one of the one or more network measurements for the underlying network path; and
combine the at least one score with a score for another pair of endpoints to generate a network assessment score, the score for the another pair being a corresponding ratio between at least one of the one or more network measurements for the virtual path and at least one of the one or more network measurements for the underlying network path.

22. A non-transitory computer readable medium comprising computer executable instructions which when executed by a computer cause the computer to perform the method of:
- selecting at least a given pair of endpoints;
- determining at least one virtual path between the given pair of endpoints; determining at least one underlying network path between the given pair of endpoints;
- generating one or more flows between the given pair of endpoints over both the virtual path and the underlying network path;
- collecting one or more network measurements for the virtual path and for the underlying network path;
- determining at least one score for the given pair of endpoints at least in part by computing at least one ratio between at least one of the one or more network measurements for the virtual path and at least one of the one or more network measurements for the underlying network path; and
- combine the at least one score with a score for another pair of endpoints to generate a network assessment score, the score for the another pair being a corresponding ratio between at least one of the one or more network measurements for the virtual path and at least one of the one or more network measurements for the underlying network path.

* * * * *